No. 719,753. PATENTED FEB. 3, 1903.
J. L. CREVELING.
SYSTEM OF ELECTRICAL DISTRIBUTION.
APPLICATION FILED DEC. 7, 1900.
NO MODEL.
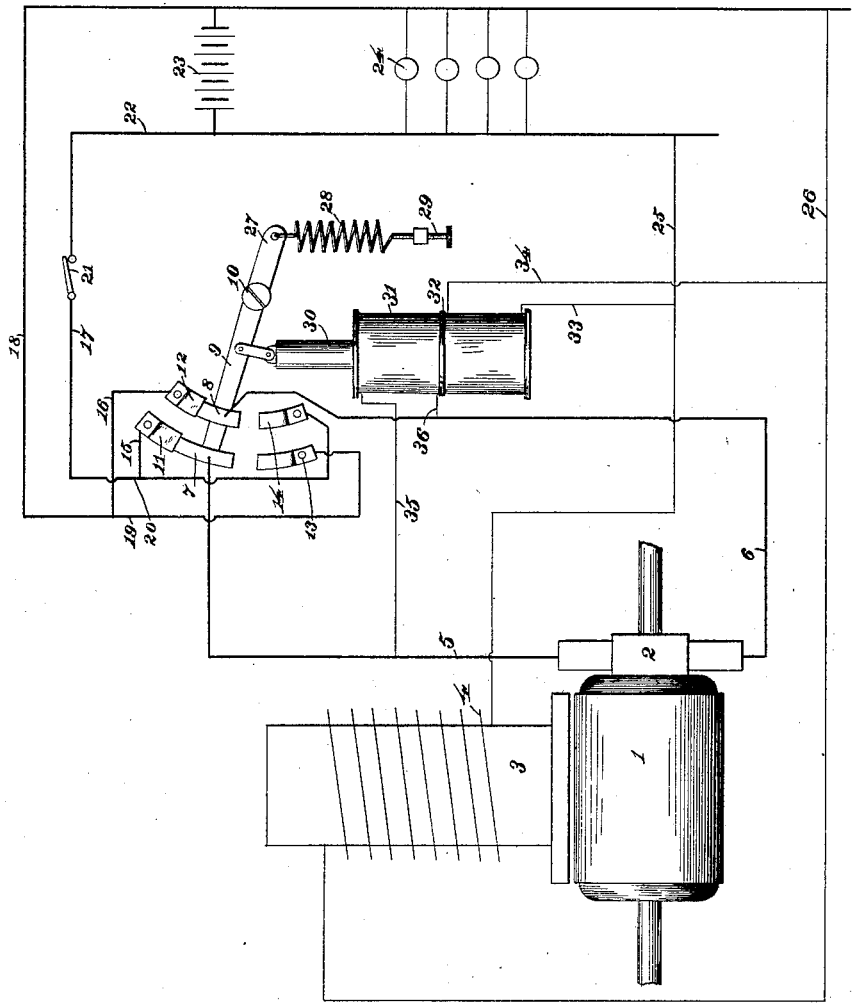
Witnesses
H. S. Austin
Karl J. Daniel
Inventor:
John L. Creveling
By Joseph H. Hoskins
Attorney

UNITED STATES PATENT OFFICE.

JOHN L. CREVELING, OF NEW YORK, N. Y.

SYSTEM OF ELECTRICAL DISTRIBUTION.

SPECIFICATION forming part of Letters Patent No. 719,753, dated February 3, 1903.

Application filed December 7, 1900. Serial No. 39,051. (No model.)

*To all whom it may concern:*

Be it known that I, JOHN L. CREVELING, of New York, in the county of New York, State of New York, have invented certain new and useful Improvements in Systems of Electrical Distribution, of which the following is a complete specification, reference being had to the accompanying drawing.

The object of my invention is to produce in a system of electrical distribution a simple, efficient, and economical pole-changing device whereby current through the mains may be kept flowing in the same direction irrespective of the direction in which the armature-shaft is revolved.

The accompanying drawing is a diagrammatic illustration of one form of embodiment of my invention, affording means for illustrating the principle thereof.

Referring to the numerals on the drawing, 1 indicates an armature, 2 its commutator, and 3 its field-magnet.

4 indicates a field exciting-coil, preferably deriving current as from a storage battery, hereinafter referred to. 5 indicates a generator lead communicating with one of its brushes, and 6 the other generator lead communicating with the other brush. These are in electrical communication, respectively, with contact-plates 7 and 8, carried upon but insulated from a movable member or lever 9, pivotally mounted, as indicated at 10. The contact-plates 7 and 8 are adapted, respectively, to make contact with fixed pairs of contact-pieces 11 and 12 and 13 and 14, located, respectively, within the limit of the arc of movement of the lever 9 and in the path of movement of the plates 7 and 8, respectively. The pieces 11 and 12 are connected, respectively, as by wires 15 and 16, with mains 17 and 18, with which also the contact-pieces 13 and 14 are connected in reverse order, as by wires 19 and 20. The main 17 connects with an automatic switch 21, adapted to close when the voltage in the mains reaches a predetermined minimum limit and to remain open until that limit is attained. This switch constitutes no part of my present invention and being familiar in the art appears to require no further illustration and description than that herein presented. The switch 21 is adapted to make and break connection with the main 22, which connects with one pole of a battery 23, with the other pole of which the main 18 is connected.

24 indicates a translating device or lamp system placed in multiple across the mains 18 and 22 with the battery.

The field exciting-coil, as illustrated, derives current from the battery 23 through wires 25 and 26, connected with the mains 22 and 18, respectively.

The lever 9 is provided with a tailpiece 27, to which is connected a spring 28, which at the other end is connected with a stud-supported tension-regulating screw 29. The tension of the spring 28 tends normally to maintain the lever 9 in the position shown in the drawing, and thereby to preserve contact between the plates 7 and 8 and the contact-pieces 11 and 12, respectively. The lever is designed to be actuated as a pole-changer against the force of its spring 28, and is therefore linked to a magnetically-attractable member 30, illustrated as a solenoid-core that is adapted to be actuated by electromagnetic means, illustrated as the solenoid 31. The solenoid is provided with two windings, whose presence is indicated, as by a medial ring 32. The lower winding is connected, as by wires 33 and 34, with the wires 25 and 26, respectively, through which it derives a current, whose direction of flow is at all times uniform. The upper winding is connected, as by wires 35 and 36, with the generator leads 5 and 6, respectively, and therefrom derives a current whose direction of flow is dependent upon the direction of rotation of the armature 1. The upper winding of the solenoid 31 tends to attract the core 30 only when the armature is rotating, while the lower winding thereof exerts an uninterrupted tendency to attract the core. The tendency is resisted by the force of the spring 28, which, as stated, normally holds the lever 9 in the position illustrated, and thereby connects the leads 5 and 6 with the mains 17 and 18, respectively. The windings of the solenoid are so related that if the armature 1 be caused to revolve in the direction in which current will pass in the required direction through the mains when the lever 9 is in its normal position, as illustrated, the effect of the shunt-circuit through the wires 35 and 36 and the upper winding of the solenoid will be subtractive from the force exerted by the lower winding of the solenoid. Consequently the tendency of the lower winding of the solenoid to attract the core 30 will be diminished and the effect will be to assist the power of the spring 28 in holding the lever 9 in its normal position. If, on the contrary, the armature be caused to rotate in the opposite direction from that above stated, the force of the upper winding of the solenoid will become, as the field of the generator builds up, sufficient, especially when added to that of the force of the lower winding of the solenoid, to attract the core 30 against the power of the spring 28 and reverse the connections of the pole-changer. It is of course necessary that the solenoid and other members of the pole-changer shall be so adjusted that the core 30 will be attracted so as to change the position of the lever 9 before the voltage of the generator shall have reached the limit at which the switch 21 will close. Otherwise the constant direction of flow of current through the mains would not be maintained, which is a main object of my invention. By proper attention to the conditions specified the pole-changer may be automatically shifted with accuracy to preserve a constant direction of flow through the storage battery and translating device, irrespective of the direction of rotation of the armature.

It is obvious that usual means for opening the circuits in shunt to the battery may be provided to prevent waste of current; but these being merely economical and non-essential features are omitted for the sake of brevity.

What I claim is—

1. The combination in a pole-changer of a movable member yieldingly maintained in one operative position, a counteracting electromagnet, and means for operatively energizing said magnet by current in one direction only.

2. The combination with a generator, storage battery and translating device in circuit one with the other, of a pole-changer in said circuit comprising a movable member yieldingly maintained in a normal position, a solenoid-core connected with said member, a solenoid adapted to actuate said core, said solenoid being provided with a plurality of windings deriving energy, respectively, in the manner described, the energizing of either winding being insufficient to change the normal position of the movable member, but the power of both windings being adapted for that purpose.

3. The combination with a generator, storage battery, translating device and switch-controlled circuit connecting the same, of a pole-changer in said circuit comprising a movable member yieldingly maintained in one operative normal position, a solenoid-core connected with said member, a solenoid adapted to actuate said core and change the position of said member, said solenoid being provided with two windings, one deriving current from the battery and the other from the generator.

4. A pole-changer comprising the combination of a spring-actuated movable member adapted by its movement to make contact between different pairs of contact-pieces and normally maintained in one operative position, magnetically-attractable means connected with said member, and an electromagnetic member provided with a plurality of windings deriving current, respectively, from a source affording a uniform direction of flow, and a source affording periodically a flow in opposite directions.

5. The combination with a generator, storage battery, and translating device in circuit one with the other, of a pole-changer in said circuit comprising a movable member, spring-actuated means for normally maintaining the pole-changer in one circuit-closing position and counteractive electromagnetic means adapted to shift the position of the pole-changer to its other operative position by current in one direction only.

In testimony of all which I have hereunto subscribed my name.

JOHN L. CREVELING.

Witnesses:
 FREDERICK E. KESSINGER,
 EDW. C. SOFIO.